US012552198B2

(12) United States Patent
Davis, III et al.

(10) Patent No.: US 12,552,198 B2
(45) Date of Patent: Feb. 17, 2026

(54) RACING WHEEL

(71) Applicant: LB Davis Enterprises, LLC, Kearney, MO (US)

(72) Inventors: Louis Buchanan Davis, III, Kearney, MO (US); Michael Kent, Olathe, KS (US)

(73) Assignee: LB DAVIS ENTERPRISES, LLC, Kearney, MO (US)

( * ) Notice: Subject to any disclaimer, the term of this patent is extended or adjusted under 35 U.S.C. 154(b) by 518 days.

(21) Appl. No.: 18/076,681

(22) Filed: Dec. 7, 2022

(65) Prior Publication Data

US 2024/0190173 A1  Jun. 13, 2024

(51) Int. Cl.
*B60B 25/12* (2006.01)
*B60B 21/02* (2006.01)
(Continued)

(52) U.S. Cl.
CPC ............ *B60B 25/12* (2013.01); *B60B 21/023* (2013.01); *B60B 21/102* (2013.01);
(Continued)

(58) Field of Classification Search
CPC ....... B60B 25/10; B60B 25/12; B60B 21/023; B60B 21/102; B60B 21/104;
(Continued)

(56) References Cited

U.S. PATENT DOCUMENTS 2,576,736 A * 11/1951 Watkins .............. B60C 15/0213
152/397
3,283,800 A * 11/1966 Ischinger ................ B60B 25/04
152/397
(Continued)

FOREIGN PATENT DOCUMENTS

DE   202019100750 U1 *  6/2020
EM   D220241-001       4/2022
(Continued)

OTHER PUBLICATIONS

"16x6 820M Twisted Gloss Black Aluminum Trailer Wheel" Trailer Wheels., posted date Oct. 31, 2021 [online], [retrieved on May 5, 2020]. Retrieved from the Internet <URL: https://www.trailer-wheels.com/16x6-820M-Twisted-Gloss-Black-Aluminum-Trailer-Wheel-8x650-820M-66080_p_1670.html#.Yn RbqHbMJaQ> (Year: 2021).
(Continued)

*Primary Examiner* — Kip T Kotter
(74) *Attorney, Agent, or Firm* — Sheridan Ross P.C.

(57) ABSTRACT

A wheel is provided that combines the principles of a beadlock wheel and a liner wheel for improved performance in motor racing, in particular drag racing. The wheel has beadlock rings that fasten to inner and outer rims of the wheel to secure an outer tire, and the wheel has knurls interior to the inner and outer rims to secure an inner tire. Projections from the inner and outer rims are arranged to accommodate the various functions of the combination of the beadlock rings and the inner tire. The projections counterintuitively add weight to the wheel, yet the combination of beadlock rings and an inner tire results in improved stability and safety as well as faster times on the racetrack.

20 Claims, 7 Drawing Sheets

(51) Int. Cl.
*B60B 21/10* (2006.01)
*B60B 25/10* (2006.01)
*B60C 5/22* (2006.01)
*B60C 15/02* (2006.01)
*B60C 29/02* (2006.01)

(52) U.S. Cl.
CPC ............ *B60B 21/106* (2013.01); *B60B 25/10* (2013.01); *B60C 5/22* (2013.01); *B60C 15/0213* (2013.01); *B60C 29/02* (2013.01); *B60B 2360/102* (2013.01); *B60B 2360/104* (2013.01); *B60B 2360/106* (2013.01); *B60B 2360/108* (2013.01); *B60B 2360/3416* (2013.01)

(58) Field of Classification Search
CPC .............. B60B 21/106; B60C 15/0213; B60C 15/0226; B60C 15/032; B60C 5/22; B60C 17/01; B60C 29/02
See application file for complete search history.

(56) References Cited

U.S. PATENT DOCUMENTS

| | | | |
|---|---|---|---|
| 3,977,727 A * | 8/1976 | Glasenapp | B60B 21/10 152/384 |
| 4,206,797 A * | 6/1980 | Holland, Sr. | B60B 25/00 152/454 |
| 4,505,314 A * | 3/1985 | Goudy | B60B 21/10 152/398 |
| D288,197 S * | 2/1987 | Goudy | D12/210 |
| D494,118 S * | 8/2004 | Darnell | D12/204 |
| D609,156 S | 2/2010 | Rider et al. | |
| D609,622 S | 2/2010 | Rider et al. | |
| D696,174 S | 12/2013 | Rider et al. | |
| D701,478 S | 3/2014 | Rider et al. | |
| 9,481,205 B2 | 11/2016 | Rider et al. | |
| D787,407 S | 5/2017 | Chung | |
| D828,271 S | 9/2018 | Han | |
| D828,878 S | 9/2018 | Sprowl | |
| 10,357,993 B2 | 7/2019 | Müller et al. | |
| D860,904 S | 9/2019 | Milani | |
| D860,908 S | 9/2019 | Han | |
| D896,729 S | 9/2020 | Chung | |
| D904,271 S | 12/2020 | Henderson | |
| D904,272 S | 12/2020 | Lickliter | |
| D904,274 S | 12/2020 | Sempek | |
| D904,963 S | 12/2020 | Hale, Jr. | |
| D911,245 S | 2/2021 | Chung | |
| D926,655 S | 8/2021 | Lickliter | |
| D931,178 S | 9/2021 | Podlovits | |
| D936,549 S | 11/2021 | Sempek | |
| D941,724 S | 1/2022 | Sempek | |
| D941,725 S | 1/2022 | Sempek | |
| D943,484 S | 2/2022 | Sempek | |
| D944,174 S | 2/2022 | Swerdloff | |
| D944,704 S | 3/2022 | Anscheidt et al. | |
| D945,342 S | 3/2022 | Sempek | |
| D945,344 S | 3/2022 | Abderrazak | |
| D945,348 S | 3/2022 | Sempek | |
| D946,484 S | 3/2022 | Johnson | |
| D947,740 S | 4/2022 | Bernoni | |
| D947,741 S | 4/2022 | Manzoni | |
| D974,986 S | 1/2023 | Kent | |
| 2003/0080609 A1 * | 5/2003 | Darnell | B60B 25/08 301/95.11 |
| 2006/0220444 A1 | 10/2006 | Darnell | |
| 2007/0261774 A1 * | 11/2007 | Re Fiorentin | B60C 7/26 301/95.101 |
| 2009/0020201 A1 * | 1/2009 | Ohara | B60C 17/01 152/340.1 |
| 2009/0151876 A1 | 6/2009 | Rider | |
| 2010/0320830 A1 | 12/2010 | Rider | |
| 2013/0147255 A1 * | 6/2013 | Rider | B60B 21/125 301/23 |
| 2016/0221389 A1 | 8/2016 | Rickels | |
| 2020/0122503 A1 * | 4/2020 | Taylor | B60B 25/08 |
| 2022/0080784 A1 | 3/2022 | Yoon et al. | |
| 2022/0118793 A1 | 4/2022 | Kerkvliet et al. | |

FOREIGN PATENT DOCUMENTS

| | | | | |
|---|---|---|---|---|
| EP | | 3599106 A1 * | 1/2020 | ........... B60B 25/045 |
| WO | WO-2021217000 A1 * | | 10/2021 | |

OTHER PUBLICATIONS

"Raceline Wheels 944 Outlander" SoCal Custom Wheels., posted date Mar. 20, 2019 [online], [retrieved on May 5, 2020]. Retrieved from the Internet <URL: https://www.socalcustomwheels.com/944-outlander-gloss-black-6-lug-w-54008.htm> (Year: 2019.

"Touren TR60 18 Black Wheel/Rim" Motosport., posted date Oct. 14, 2012 [online], [retrieved on May 5, 2020]. Retrieved from the Internet <URL: https://www.amazon.com/Touren-Black-Offset-Partnumber-3260-8811MB/dp/B009LR2CMM/ref=sr_1_12?keywords=car+wheel+rims&qid=1651791685&sr=8-12> (Year: 2012).

"Weld Delta 1 Drag Racing Wheel," Weld Wheels, 2012, 3 pages.

* cited by examiner

RACING WHEEL

FIELD OF THE INVENTION

The disclosure relates to a wheel, in particular for motor racing, that includes both an inner tire and a beadlock for an outer tire.

BACKGROUND OF THE INVENTION

Vehicles used in motor racing are specially constructed and have exacting components that are optimized for maximum performance. In motor races such as drag races, vehicles can reach speeds of over 250 miles per hour, and finishing times are measured to the thousandth or even ten thousandth of a second. Therefore, even small improvements to performance can impact the result of a race. One way to improve performance is to reduce the weight of components to reduce the overall weight of the vehicle. With an equivalent power output, a lighter vehicle can achieve faster speeds since the lighter vehicle has a greater power-to-weight ratio. Wheels are components where weight is reduced to improve the overall performance of the vehicle. Typical racing wheels can weigh more than 20 lbs. each, and at least one tire is secured to the wheel to contact a ground surface. Two types of wheels used in motor racing, in particular drag racing, include a beadlock wheel and a liner wheel.

The beadlock wheel has a single tire that is secured to the wheel with beadlock rings. The wheel has an inner rim and an outer rim, and an inner bead of the tire is secured between the inner rim and an inner beadlock ring that is fastened to the inner rim. Similarly, an outer bead of the tire is secured between the outer rim and an outer beadlock ring that is fastened to the outer rim. With a beadlock wheel, the tire is firmly secured to the wheel, even in the presence of a large torque applied by the drivetrain to the wheel.

The liner wheel uses an inner tire or liner tire to secure an outer tire to the wheel. This wheel also has an inner rim and an outer rim, and the outer tire is positioned on the wheel such that an inner bead of the outer tire is positioned on an interior side of the inner rim and an outer bead of the outer tire is positioned on an interior side of the outer rim. An inner tire is positioned around the wheel and within the outer tire. As the inner tire is inflated, the inner tire drives the inner bead of the outer tire outward into the inner rim and drives the outer bead of the outer tire outward into the outer rim to secure the outer tire to the wheel. A wheel with an inner tire adds more stability and shape to the outer tire.

SUMMARY OF THE INVENTION

Embodiments of the present disclosure relate to a wheel that combines the principles of a beadlock wheel and a liner wheel to both secure an outer tire with a beadlock and provide an inner tire that adds more stability and shape to the outer tire. To accomplish this combination, some structure is added to the wheel compared to a typical beadlock wheel and/or liner wheel. Thus, counterintuitively, some weight is added to the wheel, up to 4 lbs., yet the wheel described herein performs better on the racetrack in terms of safety, stability, speed, and finishing times.

It is one aspect of embodiments of the present disclosure to provide a wheel with an inner rim and an outer rim having respective projections that are sufficiently wide to accommodate a beadlock, an inner tire, and other features. For a typical beadlock wheel, a bead of a tire is secured between a projection of a beadlock ring and a projection of the rim of the wheel, and these projections are the same, or similar, in size to accomplish only the locking function without adding any more weight to the wheel than is necessary. In contrast, in embodiments of the present disclosure, the projections of the rims are wider than the projections of the respective prior art beadlock rings to serve multiple functions including securing the outer tire and securing the inner tire. Therefore, the wheel incurs the benefits of both a beadlock wheel and a liner wheel.

Moreover, the wheel of the present disclosure improves upon deficiencies of prior art wheels. For instance, the inner tire of the present wheel seals against the wheel itself and does not directly receive forces from the outer tire. As a result, the inner tire of the present disclosure has a more secure seal than an inner tire of a liner wheel. In addition, the inner and outer tires of the present disclosure can be filled with air to a more precise pressure for better performance on the racetrack than prior art wheels. Better balance among wheels and tires means a vehicle, in particular a vehicle for drag races, travels straighter and truer rather than side to side. Even if the seal between the inner tire and the wheel fails, the outer tire remains secured with a beadlock, which improves the safety of the wheel of the present disclosure. In other words, the outer tire remains secured to the wheel of the present disclosure if the seal between the inner tire and the wheel fails because the inner tire does not seal the outer tire to the wheel.

It is another aspect of embodiments of the present disclosure to provide a wheel with an outer rim projection with a channel to receive a valve stem. Consequently, the outer rim projection is wider than the inner rim projection to accomplish this additional function. This stands in contrast to prior art wheels which generally have inner and outer rims that are the same or similar in size to accomplish fewer functions. It will be appreciated that the present disclosure encompasses embodiments where the inner rim projection has a channel and the outer rim projection does not have a channel, thus, the inner rim projection is wider than the outer rim projection. Moreover, the inner rim projection and the outer rim projection can have equal widths, with or without a channel, in some embodiments.

The channel extends into an outer surface and about a circumference of the outer rim projection. The channel relieves some weight out of the outer rim projection and also provides a location to drill and tap a hole to place a valve stem for the outer tire. The hole can be drilled and tapped to receive any valve stem that is commonly used in motor racing. In some prior liner wheels, a hole is drilled and tapped for a valve stem, then air is fed through the valve stem, through channels of the inner tire, and into the outer tire. With the hole through the channel in the outer rim projection of the present disclosure, air can be fed directly into the outer tire without contacting the inner tire at all. With the inner tire better sealed and the valve stem in this location, the air pressure in the outer tire can be precisely controlled to provide even air pressure among multiple wheels and tires on a vehicle and a more stabilized interface with the ground surface.

It is a further aspect of embodiments of the present disclosure to provide a wheel with enhanced surfaces such as knurls at key locations to secure the inner and outer tires. Knurls are provided on surfaces of the beadlock rings and rims that engage the beads of the outer tire. A knurl may continuously circumscribes the beadlock ring or rim in various embodiments. In some embodiments, the "knurl" is a series of discrete areas of enhanced surfaces or protuberances around the circumference of the beadlock ring or rim. Further still, the interior of the wheel can also have knurls to engage the inner tire. Generally, the wheel comprises an outer portion, an inner portion, a middle portion joining the outer and inner portions, and a hub joined to the middle portion. The inner tire has an inner bead that contacts a knurl on the inner portion and has an outer bead that contacts a knurl on the outer portion. The interface with the knurls provides a more secure fit and a better seal.

It is another aspect of embodiments of the present disclosure to improve the speed of assembly and disassembly of the tires onto or off of the wheel. In some embodiments, the inner tire is first fit over and past one of the rims of the wheel, then the outer tire is secured with beadlock rings, and finally the tires are inflated. To have the inner and outer rim projections both hold the outer tire and allow the inner tire to pass over, the projections each have a particular height dimension. If the projections are too tall, then the inner tire cannot easily fit onto the wheel, and if the projections are too short, then the projections cannot sufficiently hold the outer tire with the beadlock rings. The nominal diameter of the wheel at the inner portion is 16 inches in some embodiments, and thus, each height of the inner and outer rim projections is between approximately 0.55 and 0.65 inches, respectively. In some embodiments, each height is approximately 0.60 inches, respectively. Each height can also be expressed in relative terms for various wheel sizes. For instance, in some embodiments, each height is between approximately 3.5% and 4% of the nominal diameter, even if the nominal diameter of the wheel ranges between, for instance, 14-18 inches. However, it will be appreciated that each height may remain constant, even if the nominal diameter of the wheel is different than 16 inches. Each height of the inner and outer rim projections balances the functions of securing the outer tire, securing the inner tire, and having a channel for a valve stem in the case of the outer rim projection as well as allowing the inner tire to fit over and past the inner or outer rim projection for fast assembly and disassembly of the tires onto or off of the wheel.

It is an aspect of embodiments of the present disclosure to provide a wheel with an overall width dimension to accommodate existing, conventional inner or outer tires and even wider inner and outer tires. As described herein, the inner rim projection and the outer rim projection have a particular size to address a variety of functions. To accommodate these rim projections, the overall width of the wheel, as measured between the outer surface of the outer rim and the outer surface of the inner rim, is between 17 and 18 inches (431.8 and 457.2 mm) in some embodiments. In various embodiments, the overall width of the wheel is approximately 17.34 inches (440.4 mm). As a result, the wheel of the present disclosure can be used with existing inner or liner tires. Moreover, the wheel can be used with larger inner and/or outer tires for a more controlled tire contact patch with the ground surface. This allows for a more aggressive start of a race and more stability and safety at higher speeds.

One particular embodiment of the present disclosure is a racing wheel, comprising an inner portion, a middle portion, and an outer portion, wherein the middle portion joins the inner and outer portions, and a hub extends from the middle portion and is configured to engage a wheel hub assembly of a vehicle; an inner rim positioned at a distal end of the inner portion, wherein the inner rim has an inner rim projection that extends radially outwardly relative to the inner portion, and the inner rim projection has a width; an outer rim positioned at a distal end of the outer portion, wherein the outer rim has an outer rim projection that extends radially outwardly relative to the outer portion, and the outer rim projection has a width, and wherein the width of the outer rim projection is larger than the width of the inner rim projection; a channel extending radially into the outer rim projection; an inner beadlock ring configured to engage the inner rim and to secure an inner bead of an outer tire; and an outer beadlock ring configured to engage the outer rim and to secure an outer bead of the outer tire.

In some embodiments, the wheel further comprises an inner portion knurl on an outer surface of the inner portion and proximate to the inner rim, wherein the inner portion knurl is configured to engage an inner bead of an inner tire; and an outer portion knurl on an outer surface of the outer portion and proximate to the outer rim, wherein the outer portion knurl is configured to engage an outer bead of the inner tire. In various embodiments, the outer beadlock ring has an outer beadlock projection with a width, wherein the width of the outer rim projection is larger than the width of the outer beadlock projection. In some embodiments, the inner beadlock ring has an inner beadlock projection with a width, wherein the width of the inner rim projection is larger than the width of the inner beadlock projection.

In various embodiments, the width of the outer rim projection is between approximately 0.45 and 0.65 inches. In some embodiments, the channel is configured to receive a valve stem, and the channel has a width that is between approximately 0.15 and 0.35 inches. In various embodiments, the outer rim projection has a height that is between approximately 3.5% and 4% of a nominal diameter of the inner portion.

Another particular embodiment of the present disclosure is a racing wheel, comprising an inner portion, a middle portion, and an outer portion, wherein the middle portion joins the inner and outer portions, and a hub extends from the middle portion and is configured to engage a wheel hub assembly of a vehicle; an inner rim positioned at a distal end of the inner portion; an outer rim positioned at a distal end of the outer portion; an inner beadlock ring configured to engage the inner rim and to secure an inner bead of an outer tire; an outer beadlock ring configured to engage the outer rim and to secure an outer bead of the outer tire; an inner enhanced portion on an outer surface of the inner portion and proximate to the inner rim, wherein the inner enhanced portion is configured to engage an inner bead of an inner tire; and an outer enhanced portion on an outer surface of the outer portion and proximate to the outer rim, wherein the outer enhanced portion is configured to engage an outer bead of the inner tire.

In some embodiments, the inner enhanced portion is a knurl, and the outer enhanced portion is a knurl. In various embodiments, the wheel further comprises an inner rim projection of the inner rim, wherein the inner rim projection extends radially outwardly relative to the inner portion, and the inner rim projection has a width in an axial direction and is configured to separate the outer tire and the inner tire; an outer rim projection of the outer rim, wherein the outer rim projection extends radially outwardly relative to the outer portion, and the outer rim projection has a width in an axial direction, and wherein the width of the outer rim projection is larger than the width of the inner rim projection, and the outer rim projection is configured to separate the outer tire and the inner tire; and a channel extending radially into the outer rim projection, wherein the channel is configured to receive a valve stem.

In various embodiments, the outer beadlock ring has an outer beadlock projection with a width in an axial direction, wherein the width of the outer rim projection is larger than the width of the outer beadlock projection. In some embodiments, the inner enhanced portion extends around a circumference of the inner portion, and the outer enhanced portion extends around a circumference of the outer portion. In various embodiments, the wheel further comprises an inner beadlock knurl on the inner beadlock ring; and an inner rim knurl on the inner rim, wherein the inner beadlock knurl and the inner rim knurl are configured to contact and secure the inner bead of the outer tire. In some embodiments, the wheel further comprises an outer beadlock knurl on the outer beadlock ring; and an outer rim knurl on the outer rim, wherein the outer beadlock knurl and the outer rim knurl are configured to contact and secure the outer bead of the outer tire.

A further particular embodiment of the present disclosure is a racing wheel, comprising an inner portion, a middle portion, and an outer portion, wherein the middle portion joins the inner and outer portions, and a hub extends from the middle portion and is configured to engage a wheel hub assembly of a vehicle; an inner rim positioned at a distal end of the inner portion; an outer rim positioned at a distal end of the outer portion, wherein the outer rim has an outer rim projection that extends radially outwardly relative to the outer portion, and the outer rim projection has a width; an inner beadlock ring configured to engage the inner rim and to secure an inner bead of an outer tire; and an outer beadlock ring configured to engage the outer rim and to secure an outer bead of the outer tire, wherein the outer beadlock ring has an outer beadlock projection with a width, and wherein the width of the outer rim projection is larger than the width of the outer beadlock projection.

In some embodiments, the wheel further comprises an inner portion knurl on an outer surface of the inner portion and proximate to the inner rim, wherein the inner portion knurl is configured to engage an inner bead of an inner tire; and an outer portion knurl on an outer surface of the outer portion and proximate to the outer rim, wherein the outer portion knurl is configured to engage an outer bead of the inner tire. In various embodiments, the wheel further comprises an inner rim projection of the inner rim, wherein the inner rim projection extends radially outwardly relative to the inner portion, and the inner rim projection has a width, wherein the width of the outer rim projection is larger than the width of the inner rim projection; and a channel extending radially into the outer rim projection, wherein the channel is configured to receive a valve stem.

In some embodiments, the outer portion is configured to receive a second valve stem. In various embodiments, the inner portion, the middle portion, the outer portion, and the hub are a continuous structure. In some embodiments, the continuous structure is made of one of an aluminum alloy, a steel alloy, a magnesium alloy, a titanium alloy, or a carbon fiber material.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein. The use of "engaged with" and variations thereof herein is meant to encompass any direct or indirect connections between components.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

It is to be appreciated that any feature or aspect described herein can be claimed in combination with any other feature (s) or aspect(s) as described herein, regardless of whether the features or aspects come from the same described embodiment.

Any one or more aspects described herein can be combined with any other one or more aspects described herein. Any one or more features described herein can be combined with any other one or more features described herein. Any one or more embodiments described herein can be combined with any other one or more embodiments described herein.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and together with the general description of the invention given above and the detailed description of the drawings given below, serve to explain the principles of the invention.

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

2 Wheel
4 Hub
6 Hub Aperture
8 Inner Rim
9 Distal End
10 Inner Rim Knurl
12 Inner Rim Aperture
14 Outer Rim
15 Distal End
16 Outer Rim Knurl
18 Outer Rim Aperture
20 Inner Beadlock Ring
22 Inner Ring Aperture
24 Outer Beadlock Ring
26 Outer Ring Aperture
28 Inner Portion
30 Middle Portion
32 Outer Portion
34 Inner Beadlock Knurl
36 Outer Beadlock Knurl
38 Inner Portion Knurl
40 Outer Portion Knurl
42 Channel
44 Inner Tire Valve Stem
46 Outer Tire Valve Stem
48 Inner Beadlock Projection
50 Inner Rim Projection
52 Reference Line
54 Inner Beadlock Projection Height
56 Inner Beadlock Projection Width
58 Inner Rim Projection Height
60 Inner Rim Projection Width
62 Outer Rim Projection
64 Outer Beadlock Projection
66 Outer Rim Projection Height
68 Outer Rim Projection Width
70 Channel Depth
72 Channel Width
74 Outer Beadlock Projection Height
76 Outer Beadlock Projection Width
78 Outer Tire
80 Outer Tire Inner Bead
82 Outer Tire Outer Bead
84 Inner Tire
86 Inner Tire Inner Bead
88 Inner Tire Outer Bead
90 Centerline
92 Nominal Wheel Diameter
94 Wheel Width
96 Void

DETAILED DESCRIPTION

Although the following text sets forth a detailed description of numerous different embodiments, it should be understood that the legal scope of the description is defined by the words of the claims set forth at the end of this disclosure. The Detailed Description is to be construed as exemplary only and does not describe every possible embodiment of the wheel since describing every possible embodiment would be impractical, if not impossible. Numerous alternative embodiments could be implemented, using either current technology or technology developed after the filing date of this patent, which would still fall within the scope of the claims. Additionally, any combination of features shown in the various figures can be used to create additional embodiments of the present invention. Thus, dimensions, aspects, and features of one embodiment of the wheel can be combined with dimensions, aspects, and features of another embodiment of the wheel to create the claimed embodiment.

Figure 1A:
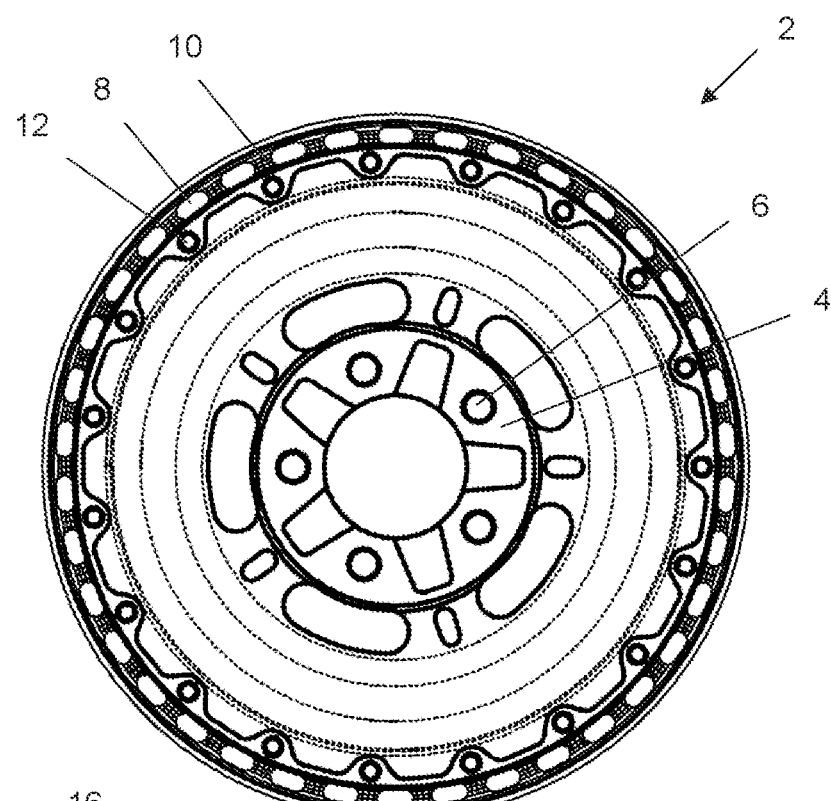
FIG. 1A is an inner side elevation view of a wheel in accordance with an embodiment of the present disclosure.
Figure 1B:
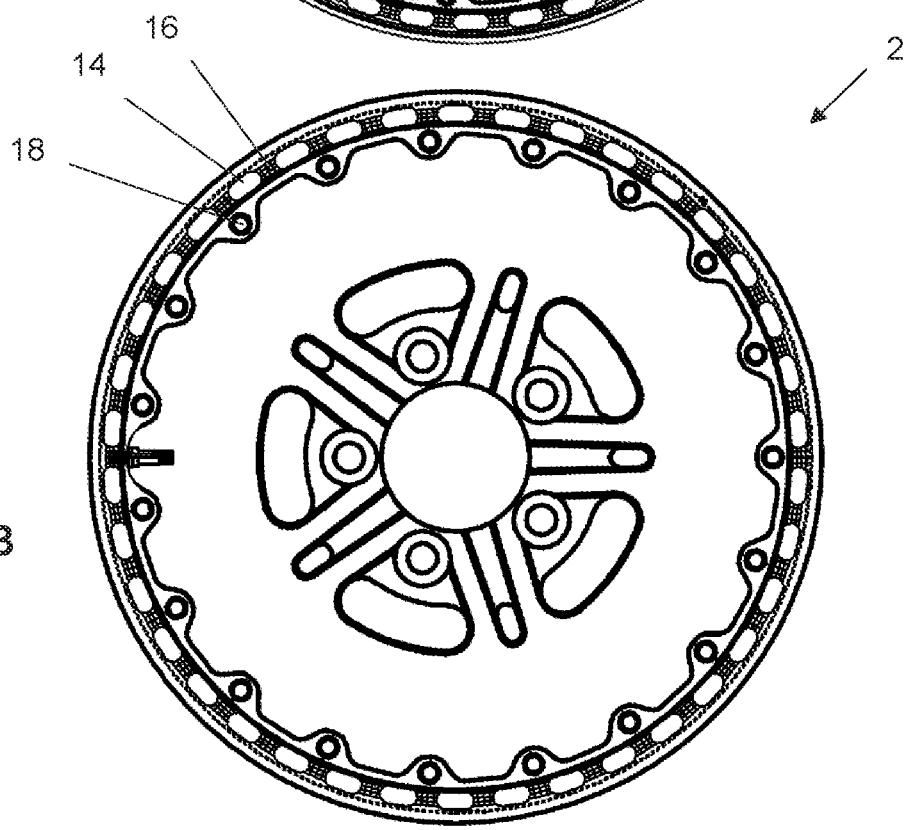
FIG. 1B is an outer side elevation view of the wheel in FIG. 1A in accordance with an embodiment of the present disclosure.

FIGS. 1A and 1B are an inner side elevation view and an outer side elevation view, respectively, of a wheel 2 for use in motor racing such as drag racing. The wheel 2 combines the principles of a beadlock wheel and a liner wheel for an improvement in performance despite the inclusion of additional structure and weight, as described herein. The wheel 2 has a hub 4 with apertures 6 through which fasteners join the wheel 2 to a wheel hub assembly of a vehicle. While five apertures 6 are shown in the figures, the present disclosure encompasses embodiments of the wheel 2 with any number and configuration of apertures 6. The wheel 2 also has an inner rim 8 and an outer rim 14.

As shown in FIG. 1A, the inner rim 8 has an enhanced surface or an inner rim knurl 10. Enhanced surfaces can be any surface that increases the ability to grip or secure a tire. A knurl is a type of enhanced surface, and the inner rim knurl 10 is at least one cut made into the surface of the inner rim 8 to create a pattern that increases the ability of the inner rim 8 to grip or secure a tire. The at least one cut can be a series of straight and/or curved cuts, a crisscross pattern of cuts, etc. In FIG. 1A, the inner rim knurl 10 extends around a circumference of the inner rim 8 and wheel 2 as multiple, discrete areas of patterns. It will be appreciated that the inner rim knurl 10 can be a single, continuous pattern around the circumference of the inner rim 8.

FIG. 1B shows an outer rim 14 that is similarly configured as the inner rim 8. The outer rim 14 has an outer rim knurl 16 in a similar pattern as the inner rim 8, but it will be appreciated that the outer rim 14 can have an outer rim knurl 16 with a different pattern and configuration than the inner rim knurl 10. Each of the inner rim 8 and the outer rim 14 has respective apertures 12, 18 extending around a circumference of the rims 8, 14. These apertures 12, 18 are configured to receive fasteners to secure an inner beadlock ring to the inner rim 8 and secure an outer beadlock ring to the outer rim 14, which secures bead portions of an outer tire to the wheel 2 as described in further detail herein.

Figure 2A:
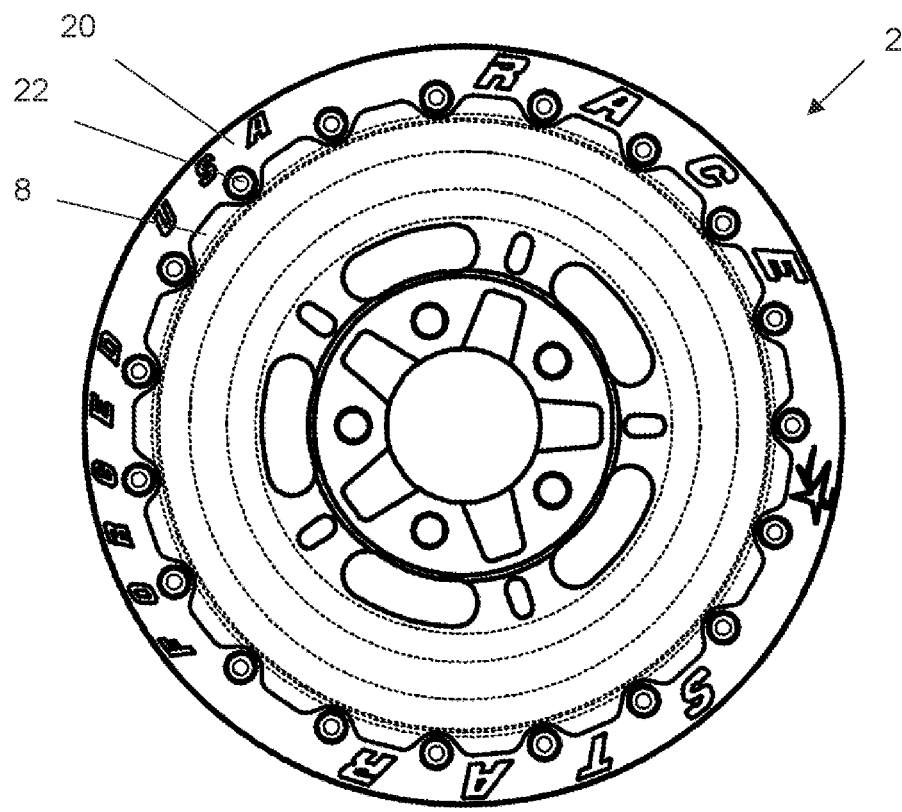
FIG. 2A is an inner side elevation view of the wheel in FIG. 1A with an inner beadlock ring in accordance with an embodiment of the present disclosure.
Figure 2B:
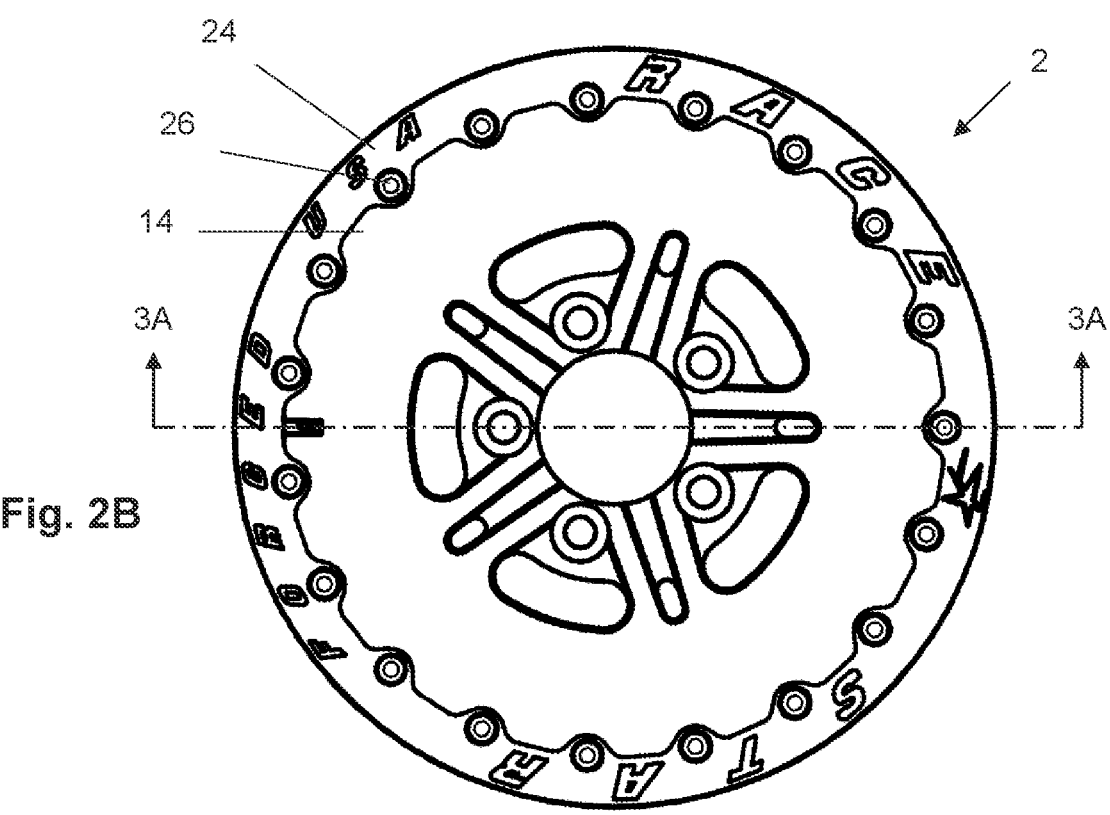
FIG. 2B is an outer side elevation view of the wheel in FIG. 1A with an outer beadlock ring in accordance with an embodiment of the present disclosure.

FIGS. 2A and 2B are inner and outer side elevation views, respectively, of wheel 2 with beadlock rings 20, 24 attached. Specifically, fasteners extend through apertures 22 in an inner beadlock ring 20 and into the apertures of the inner rim 8 to secure the inner beadlock ring 20 to the inner rim 8 and to secure an inner bead of an outer tire to the wheel 2. Similarly, fasteners extend through apertures 26 in an outer beadlock ring 24 and into the apertures of the outer rim 14 to secure the outer beadlock ring 24 to the outer rim 14 and to secure an outer bead of the outer tire to the wheel 2. FIG. 2B also shows line 3A-3A.

Note that the apertures 12 of the inner rim 8 are sized, shaped, and positioned to align with the apertures 22 in the inner beadlock ring 20 such that fasteners can extend through the apertures 12 of the inner rim 8 and apertures 22 of the inner beadlock ring 20 to secure the inner beadlock ring 20 to the inner rim 8. Similarly, the apertures 18 of the outer rim 14 are sized, shaped, and positioned to align with the apertures 26 in the outer beadlock ring 24 such that fasteners can extend through the apertures 18 of the outer rim 14 and apertures 26 of the outer beadlock ring 24 to secure the outer beadlock ring 24 to the outer rim 14.

Figure 3A:
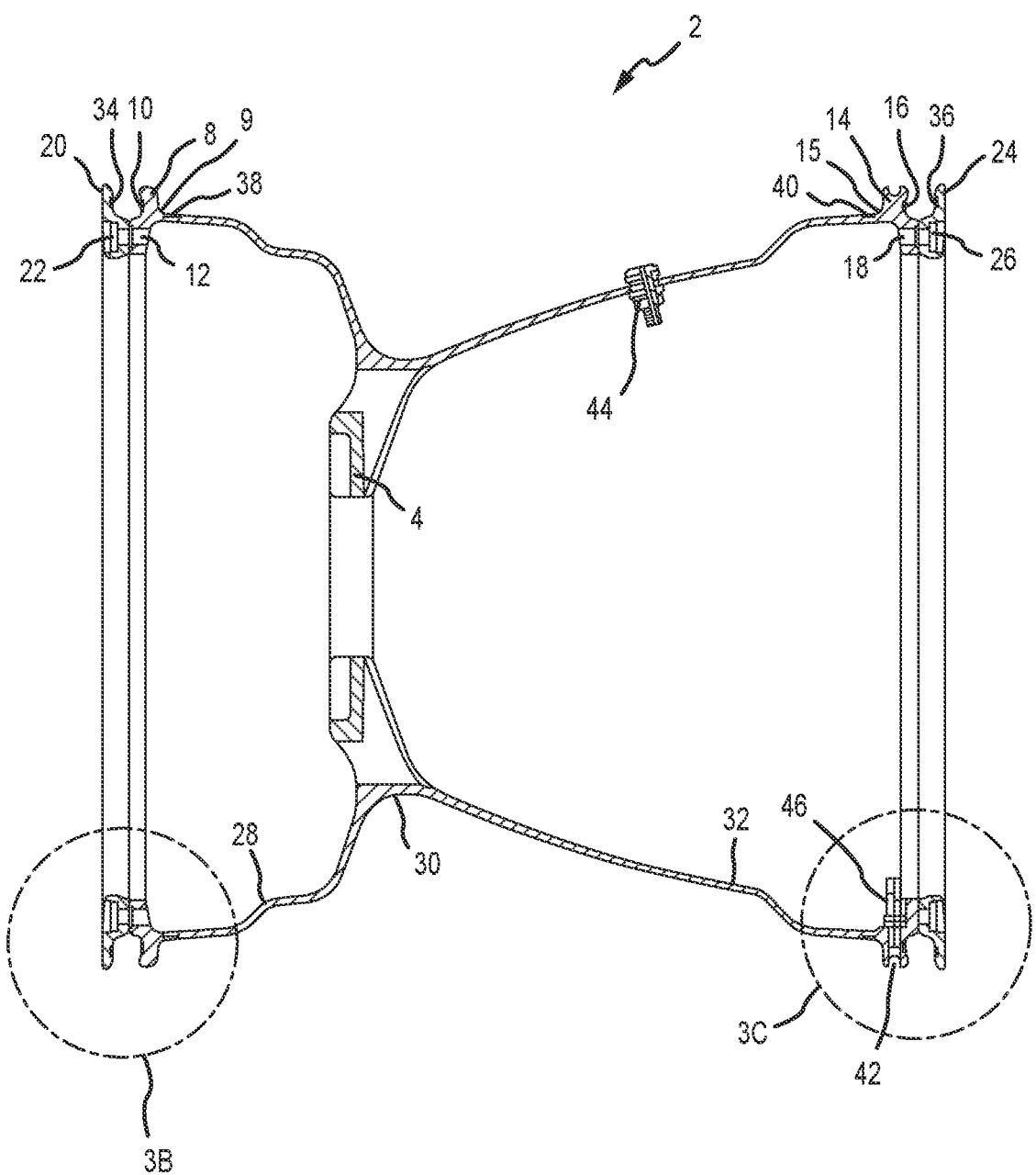
FIG. 3A is a cross-sectional view of the wheel in FIG. 1A taken along line 3A-3A in FIG. 2B in accordance with an embodiment of the present disclosure.

FIG. 3A is a cross-sectional view of the wheel 2 taken along line 3A-3A in FIG. 2B. Generally, the wheel 2 has an inner portion 28, a middle portion 30, and an outer portion 32. The outer portion 32 is positioned closer to the outside of the vehicle and the inner portion 28 is positioned closer to the center of the vehicle when the wheel is attached to a vehicle, such as a racecar. The middle portion 30 joins the inner portion 28 and the outer portion 32, and the hub 4 of the wheel is connected to the middle portion 30. Moreover, the inner rim 8 is positioned at a distal end 9 of the inner portion 28, and the outer rim 14 is positioned at a distal end 15 of the outer portion 32. These parts of the wheel 2 can be made as a single continuous structure by a manufacturing process such as molding, injection molding, or additive manufacturing or printing. In some embodiments, some or all of these parts of the wheel 2 can be made separately and then combined by a manufacturing process such as stir welding or friction welding. The present disclosure encompasses any method of manufacturing the wheel 2. Moreover, the present disclosure encompasses any type of material used to construct the wheel 2. For example, the wheel 2 may be made from a steel alloy, an aluminum alloy, a magnesium alloy, a titanium alloy, a carbon fiber material, another composite material, etc.

Several enhanced surfaces help join an outer tire and an inner tire with the wheel 2. The inner beadlock ring 20 has an inner beadlock knurl 34, and this knurl 34 in combination with the inner rim knurl 10 grips the inner bead of an outer tire to secure the outer tire to the wheel 2. The outer tire is made of rubber or an otherwise elastic material which partially deforms in the knurls 34, 10 once the inner beadlock ring 20 is secured to the inner rim 8. Similarly, the outer beadlock ring 24 has an outer beadlock knurl 36, and this knurl 36 in combination with the outer rim knurl 16 grips the outer bead of an outer tire to secure the outer tire to the wheel 2. Therefore, the outer tire is secured to the wheel 2 even when a large torque is applied to the wheel by the drivetrain of a vehicle.

Next, knurls help secure an inner tire to the wheel 2. An inner portion knurl 38 is formed on an outer surface of the inner portion 28 near the distal end 9 of the inner portion 28 and near the inner rim 8, and an outer portion knurl 40 is formed on an outer surface of the outer portion 32 near the distal end 15 of the outer portion 32 and near the outer rim 14. When an inner tire is fit over and past one of the inner rim 8 or the outer rim 14 and into position between the rims 8, 14, the inner bead of the inner tire presses into the inner portion knurl 38, and the outer bead of the inner tire presses into the outer portion knurl 40 to secure the inner tire to the wheel 2. The inclusion of an inner tire, which is inflated to a higher pressure than the outer tire, gives the outer tire shape and stability under the extreme conditions of motor racing. Moreover, the inner tire does not directly receive forces from the outer tire, unlike a conventional liner wheel, which improves the reliability and performance of the inner tire.

The outer rim 14 includes a channel 42 that extends radially into the outer rim 14 and that extends continuously around a circumference of the outer rim 14. The radial direction is substantially perpendicular to the axis of rotation or axial direction of the wheel 2 (shown as the centerline 90 in FIG. 4A), and the channel 42 serves multiple functions. The channel 42 takes weight out of the outer rim 14 to make the wheel 2 lighter, which improves the overall performance of the vehicle. In addition, the channel 42 is a location through which a hole can be drilled and tapped to receive a valve stem 46 for the outer tire. With air passing through the valve stem 46 in this location, any seal between the inner tire and the wheel 2 is not disrupted, which allows for more precise inflation of the tires. FIG. 3A also shows an inner tire valve stem 44 in the outer portion 32 of the wheel through which the inner tire is inflated. Finally, Details 3B and 3C are identified in FIG. 3A.

Figure 3B:
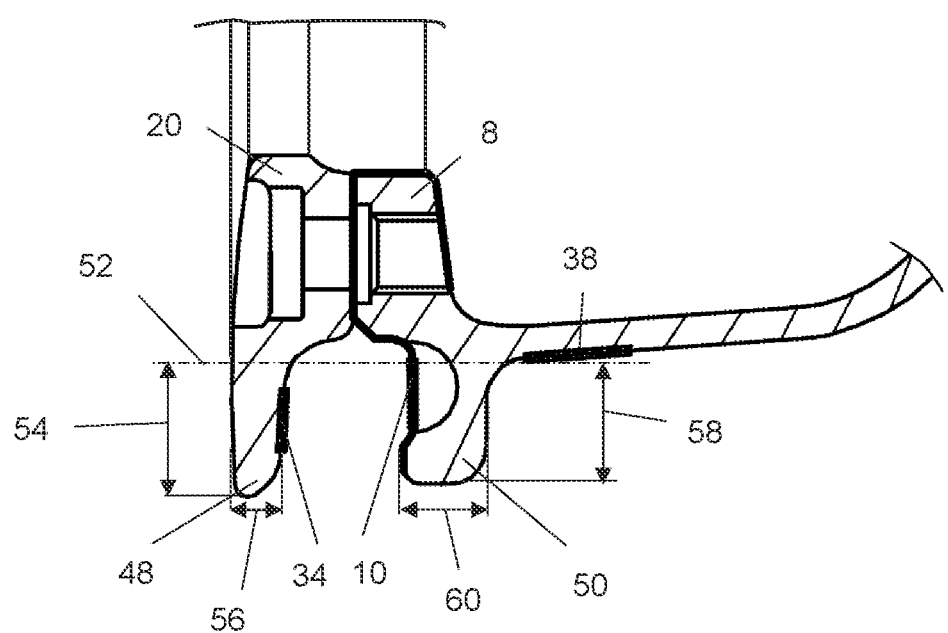
FIG. 3B is a cross-sectional view of Detail 3B in FIG. 3A in accordance with an embodiment of the present disclosure.

FIG. 3B depicts Detail 3B from FIG. 3A where various aspects of the inner rim 8 and the inner beadlock ring 20 promote and serve the functions of the wheel. The inner beadlock ring 20 has an inner beadlock projection 48 and the inner rim 8 has an inner rim projection 50 between which the inner bead of the outer tire is secured. The heights of these projections 48, 50 can be measured in a radial direction from a reference line 52, which is used to determine the nominal radius or diameter of the wheel 2 for tires sizes that fit onto the wheel 2. Specifically, the height 58 of the inner rim projection 50 from the reference line 52 is between approximately 0.5 and 0.7 inches (12.7 and 17.78 mm) in various embodiments. In some embodiments, the height 58 of the inner rim projection 50 is approximately 0.6 inches (15.25 mm). This height 58 allows an inner tire to pass over the inner rim projection 50 relatively easily for a faster mounting process while still securing the inner and outer tires.

The height 54 of the inner beadlock projection 48 from the reference line 52 is equal to or greater than the height 58 of the inner rim projection 50. As the inner tire does not need to pass over the inner beadlock ring 20, the inner beadlock projection 48 can extend farther than the inner rim projection 50 to promote the securing of the inner bead of the outer tire. In some embodiments, the height 54 of the inner beadlock projection 48 is at least 1 mm greater than the height 58 of the inner rim projection 50, i.e., is between about 13.7 and 18.78 mm, or about 16.25 mm in preferred embodiments. In various embodiments, the height 54 of the inner beadlock projection 48 is at least 2 mm greater than the height 58 of the inner rim projection 50, i.e., is between about 14.7 and 19.78 mm, or about 17.25 mm in preferred embodiments. In other embodiments, the height 54 of the inner beadlock projection 48 is the same as the height 58 of the inner rim projection 50, i.e., is between about 12.7 and 17.78 mm, or about 15.25 mm in some embodiments.

These projections 48, 50 also have widths in an axial direction (see the centerline 90 in FIG. 4A) where, in this embodiment, a width 60 of the inner rim projection 50 is greater than a width 56 of the inner beadlock projection 48. This arrangement is counterintuitive because prior art beadlock wheels have similar components that are equal or nearly equal in width to minimize weight. However, the inner rim projection 50 serves the beadlock function as well as an additional function of securing an inner tire. Accordingly, in some embodiments, the width 60 of the inner rim projection 50 is between approximately 0.3 and 0.5 inches (7.62 and 12.7 mm). In various embodiments, the width 60 of the inner rim projection 50 is approximately 0.4 inches (10.1 mm). In some embodiments, the width 56 of the inner beadlock projection 48 is between approximately 0.15 and 0.35 inches (3.81 and 8.89 mm). In various embodiments, the width 56 of the inner beadlock projection 48 is approximately 0.25 inches (6.3 mm). Stated in relative terms, in some embodiments, the width 60 of the inner rim projection 50 is between approximately 40 to 80% greater than the width 56 of the inner beadlock projection 48 where the relative difference is determined by the difference in widths 56, 60 divided by the width 56 of the inner beadlock projection 48. In various embodiments, the width 60 of the inner rim projection 50 is approximately 60% greater than the width 56 of the inner beadlock projection 48.

Figure 3C:
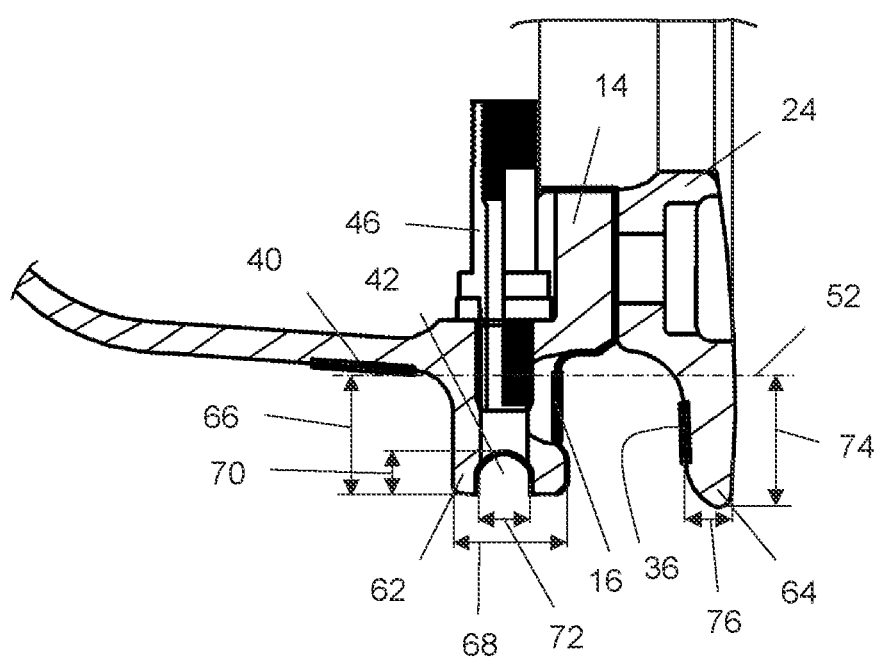
FIG. 3C is a cross-sectional view of Detail 3C in FIG. 3A in accordance with an embodiment of the present disclosure.

FIG. 3C depicts Detail 3C from FIG. 3A where various aspects of the outer rim 14 and the outer beadlock ring 24 promote and serve the functions of the wheel. The outer beadlock ring 24 has an outer beadlock projection 64 and the outer rim 14 has an outer rim projection 62 between which the outer bead of the outer tire is secured. The heights of these projections 62, 64 can be measured in a radial direction from the reference line 52. Specifically, the height 66 of the outer rim projection 62 from the reference line 52 is between approximately 0.5 and 0.7 inches (12.7 and 17.78 mm) in various embodiments. In some embodiments, the height 66 of the outer rim projection 62 is approximately 0.6 inches (15.25 mm). This height 66 allows an inner tire to pass over the outer rim projection 62 relatively easily for a faster mounting process while still securing the inner and outer tires.

The height 74 of the outer beadlock projection 64 from the reference line 52 is equal to or greater than the height 66 of the outer rim projection 62. As the inner tire does not need to pass over the outer beadlock ring 24, the outer beadlock projection 64 can extend farther than the outer rim projection 62 to promote the securing of the outer bead of the outer tire. In some embodiments, the height 74 of the outer beadlock projection 64 is at least 1 mm greater than the height 66 of the outer rim projection 62, i.e., is between about 13.7 and 18.78 mm, or about 16.25 mm in preferred embodiments. In various embodiments, the height 74 of the outer beadlock projection 64 is at least 2 mm greater than the height 66 of the outer rim projection 62, i.e., is between about 14.7 and 19.78 mm, or about 17.25 mm in preferred embodiments. In other embodiments, the height 74 of the outer beadlock projection 64 is the same as the height 66 of the outer rim projection 62, i.e., is between about 12.7 and 17.78 mm, or about 15.25 mm in some embodiments.

These projections 62, 64 also have widths in an axial direction (see the centerline 90 in FIG. 4A) where, in this embodiment, a width 68 of the outer rim projection 62 is greater than a width 72 of the outer beadlock projection 64. This arrangement is counterintuitive because prior art beadlock wheels have similar components that are equal or nearly equal in width to minimize weight. However, the outer rim projection 62 serves the beadlock function as well as an additional function of securing an inner tire. Accordingly, in some embodiments, the width 68 of the outer rim projection 62 is between approximately 0.45 and 0.65 inches (11.43 and 16.51 mm). In various embodiments, the width 68 of the outer rim projection 62 is approximately 0.56 inches (14.1 mm). In some embodiments, the width 76 of the outer beadlock projection 64 is between approximately 0.15 and 0.35 inches (3.81 and 8.89 mm). In various embodiments, the width 76 of the outer beadlock projection 64 is approximately 0.25 inches (6.3 mm). Stated in relative terms, in some embodiments, the width 68 of the outer rim projection 62 is between approximately 100 to 150% greater than the width 76 of the outer beadlock projection 64 where the relative difference is determined by the difference in widths 68, 76 divided by the width 76 of the outer beadlock projection 64. In various embodiments, the width 68 of the outer rim projection 62 is approximately 124% greater than the width 76 of the outer beadlock projection 64.

The outer rim projection 62 also has a channel 42 that extends radially into a surface of the outer rim projection 62. As described herein, the channel 42 removes some weight from the outer rim projection 62 and, thus, the overall wheel. The channel 42 is also a location to drill and tap a hole to receive a valve stem 46 for the outer tire as shown in FIG. 3C. In prior art devices, a hole for a valve stem may be drilled and tapped onto a surface. This presents a higher possibility of drilling a hole that does not conform to a specification of a manufacturer. Once a hole is improperly drilled, the wheel is scrapped. In the present wheel, the channel 42 directs a drill bit to a precise location at the trough or lowest point of the channel 42, which reduces the possibility of a misaligned hole.

In some embodiments, a depth 70 of the channel 44 is between approximately 0.1 and 0.3 inches (2.54 and 7.62 mm). In various embodiments, the depth 70 is approximately 0.20 inches (5.1 mm). In some embodiments, a width 72 of the channel 44 is between approximately 0.15 and 0.35 inches (3.81 and 8.89 mm). In various embodiments, the width 72 is approximately 0.28 inches (7 mm). In addition, the channel 44 has a semi-circular shape where the lowest point is at a centerline of the channel 44, but the channel 44 can have another shape such as a generally curved shape or even a V-shape where the lowest point is on or off of the centerline. These aspects of the channel 44 balance several functions including removing weight from the wheel, directing a drill bit to the lowest point of the semi-circular, curved, or V-shape, and allowing enough material or structure of the outer rim projection 62 to remain so that the outer rim projection 62 can secure the inner and outer tires.

Moreover, as a result of the inclusion of the channel 42, the width 68 of the outer rim projection 62 can be described as greater than the width (60 in FIG. 3B) of the inner rim projection (50 in FIG. 3B). Specifically, the width 68 of the outer rim projection 62 is between approximately 20 to 60% greater than the width 60 of the inner rim projection 50 where the relative difference is determined by the difference in widths 60, 68 divided by the width 60 of the inner rim projection 50. In various embodiments, the width 68 of the outer rim projection 62 is approximately 40% greater than the width 60 of the inner rim projection 50.

In other embodiments, the width 68 of the outer rim projection 62 is approximately the same as the width 60 of the inner rim projection 50 or is at least smaller than that shown in FIG. 3C in part because the channel 42 is smaller. Thus, instead of a true channel 42, the outer rim projection 62 could have a divot or cutout extending around the circumference of the outer rim projection 62 to direct the user where to drill and tap a hole to receive a valve stem 46 for the outer tire. If the outer rim projection 62 has a divot or cutout (e.g., cut with an end mill) that is smaller than the channel 42 shown in FIG. 3C, then the width 68 of the outer rim projection 62 can be smaller while still maintaining enough material or structure of the outer rim projection 62 so that the outer rim projection 62 can secure the inner and outer tires to the wheel.

Figure 4A:
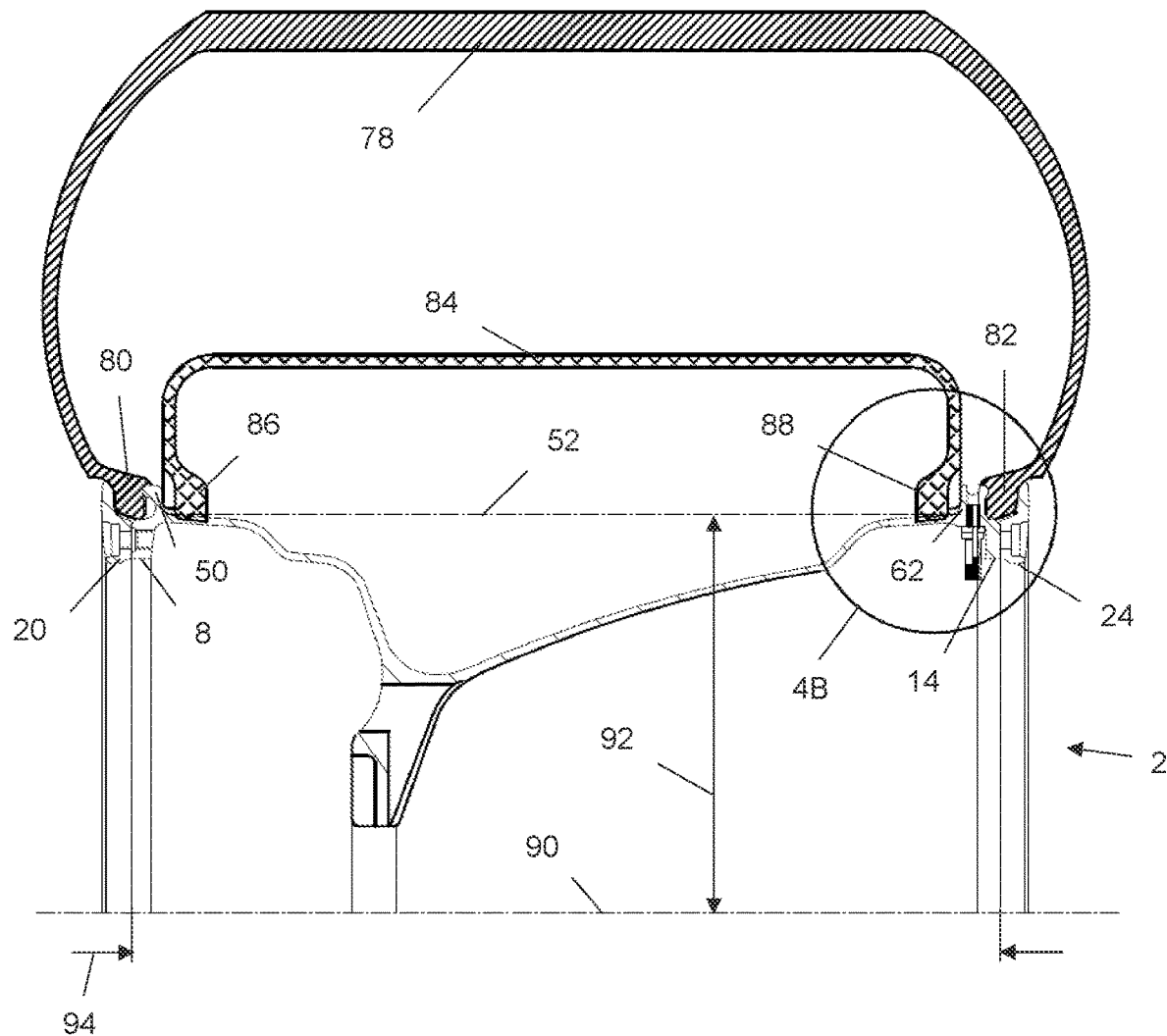
FIG. 4A is a cross-sectional view of a wheel with an inner tire and an outer tire in accordance with an embodiment of the present disclosure.

FIG. 4A shows a further cross-sectional view of the wheel 2 like the cross-sectional view shown in FIG. 3A taken along line 3A-3A, with the inclusion an inner tire 84 and an outer tire 78 secured in place. The inner beadlock ring 20 secures an inner bead 80 of the outer tire 78 against the inner rim 8, and an outer beadlock ring 24 secures an outer bead 82 of the outer tire 78 against the outer rim 14. Moreover, an inner bead 86 of the inner tire 84 is located on the interior side of the inner rim projection 50 (i.e., closer to the hub), and an outer bead 88 of the inner tire 84 is located on the interior side of the outer rim projection 62 (i.e., closer to the hub). The rim projections 50, 62 can secure the inner tire 84 in a number of ways. The inner bead 86 of the inner tire 84 may contact the inner rim projection 50, and the outer bead 88 of the inner tire 84 may contact the outer rim projection 62 to secure the inner tire 84. Additionally or alternatively, the inner tire 84 may not initially contact the inner rim projection 50 of the outer rim projection 62, but these projections 50, 62 may serve as a physical limit for lateral movement of the inner tire 84 when the wheel 2 experiences extreme forces.

The inner tire 84 is inflated to a higher pressure than the outer tire 78. In an exemplary embodiment, the inner tire 84 is inflated to a pressure of approximately 50 to 60 psi (345 to 414 kPa), and the outer tire is inflated to a pressure of approximately 5 to 10 psi (34.5 to 68.9 kPa). As noted herein, if the inner tire 84 does not properly seal to the wheel 2, the outer tire 78 is still locked in place on the wheel 2, which improves the safety of the wheel 2 and vehicle. Further, the various aspects of the wheel 2 allow for precise control of the pressure in each tire 78, 84. Considering a vehicle will have multiple wheels, the precise control allows for more balanced and stable contact with the ground surface.

Next, a centerline 90 of the wheel 2 is shown, and the centerline 90 is also the axis of rotation for the wheel 2 and denotes the axial direction. A distance between the reference line 52 and the centerline 90 is a nominal radius 92 of the wheel 2. The nominal diameter of the wheel 2 (twice the nominal radius 92) is used for sizing the tires 78, 84 that fit onto the wheel 2. In this embodiment, the nominal diameter is approximately 16 inches (406.4 mm), but other diameters are possible in other embodiments without deviating from the present disclosure. Moreover, certain key aspects of the wheel 2 that are critical to the operation and improved performance of the wheel 2 can be expressed in terms relative to the nominal diameter of the wheel 2 for various wheel 2 sizes. For example, in some embodiments, the height (58 in FIG. 3B) of the inner rim projection is between approximately 3.5% and 4% of the nominal diameter to allow the inner tire 84 to pass over the inner rim and to secure the inner and outer tires. Likewise, the height (66 in FIG. 3C) of the outer rim projection is between approximately 3.5% and 4% of the nominal diameter.

FIG. 4A also shows a width 94 of the wheel in the axial direction as measured between an outer surface of the inner rim 8 and an outer surface of the outer rim 14. In some embodiments, the width 94 is between approximately 16 and 19 inches (406.4 to 482.6 mm). In various embodiments, the width 94 is approximately 17.34 inches (440.4 mm). Accordingly, existing liner tires can be used with the wheel, or even larger inner and outer tires can be used with the wheel for improved traction with the ground surface. Lastly, FIG. 4A shows Detail 4B.

Figure 4B:
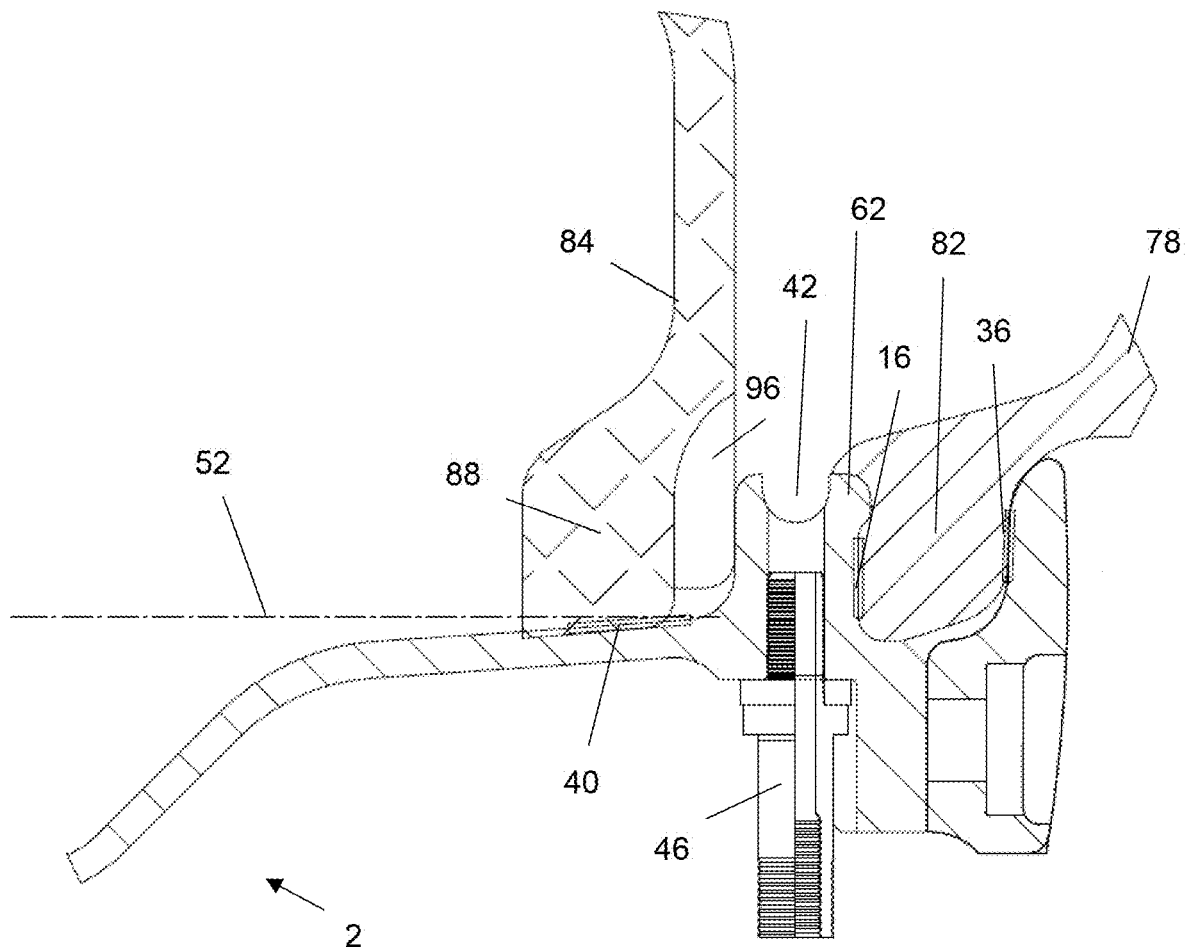
FIG. 4B is a cross-sectional view of Detail 4B in FIG. 4A in accordance with an embodiment of the present disclosure.

FIG. 4B depicts Detail 4B of FIG. 4A where the inner tire 84 and the outer tire 78 are secured to the wheel 2. Specifically, the outer bead 88 of the inner tire 84 is positioned against the outer portion knurl 40. In addition, the outer bead 88 contacts the outer rim projection 62, and similarly, the inner bead of the inner tire contacts the inner rim projection to secure the inner tire 84 to the wheel 2. The inner tire 84 depicted in FIG. 4B is a conventional inner or liner tire with voids 96 that extend into an outer surface. These voids 96 can be discrete and non-continuous around the circumference of the inner tire 84 such that at least a portion of the inner tire still contacts the outer rim projection 62. The voids 96 provide a passage to transmit air pressure to the outer tire in a conventional liner wheel, as described herein. However, it will be appreciated that the inner tire 84 may not have any voids 96, and the entire outer surface of the outer bead 88 contacts the outer rim projection 62. Finally, the outer bead 82 of the outer tire 78 is secured between the outer rim knurl 16 and the outer beadlock knurl 36.

While various embodiments of the present invention have been described in detail, it is apparent that modifications and alterations of those embodiments will occur to those skilled in the art. However, it is to be understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

What is claimed is:

1. A racing wheel, comprising:
    an inner portion, a middle portion, and an outer portion, wherein the middle portion joins the inner and outer portions, and a hub extends from the middle portion and is configured to engage a wheel hub assembly of a vehicle;
    an inner rim positioned at a distal end of the inner portion, wherein the inner rim has an inner rim projection that extends radially outwardly relative to the inner portion, and the inner rim projection has a width;
    an outer rim positioned at a distal end of the outer portion, wherein the outer rim has an outer rim projection that extends radially outwardly relative to the outer portion, and the outer rim projection has a width, and wherein the width of the outer rim projection is larger than the width of the inner rim projection;
    a channel extending continuously around a circumference of the outer rim and radially into the outer rim projection;
    an inner beadlock ring configured to engage the inner rim and to secure an inner bead of an outer tire; and
    an outer beadlock ring configured to engage the outer rim and to secure an outer bead of the outer tire.

2. The wheel of claim 1, further comprising:
    an inner portion knurl on an outer surface of the inner portion and proximate to the inner rim, wherein the inner portion knurl is configured to engage an inner bead of an inner tire; and
    an outer portion knurl on an outer surface of the outer portion and proximate to the outer rim, wherein the outer portion knurl is configured to engage an outer bead of the inner tire.

3. The wheel of claim 1, wherein the outer beadlock ring has an outer beadlock projection with a width, wherein the width of the outer rim projection is larger than the width of the outer beadlock projection.

4. The wheel of claim 1, wherein the inner beadlock ring has an inner beadlock projection with a width, wherein the width of the inner rim projection is larger than the width of the inner beadlock projection.

5. The wheel of claim 1, wherein the width of the outer rim projection is between approximately 0.45 and 0.65 inches.

6. The wheel of claim 1, wherein the channel is configured to receive a valve stem, and the channel has a width that is between approximately 0.15 and 0.35 inches.

7. The wheel of claim 1, wherein the outer rim projection has a height that is between approximately 3.5% and 4% of a nominal diameter of the inner portion.

8. A racing wheel, comprising:
an inner portion, a middle portion, and an outer portion, wherein the middle portion joins the inner and outer portions, and a hub extends from the middle portion and is configured to engage a wheel hub assembly of a vehicle;
an inner rim positioned at a distal end of the inner portion;
an outer rim positioned at a distal end of the outer portion;
an inner beadlock ring configured to engage the inner rim and to secure an inner bead of an outer tire;
an outer beadlock ring configured to engage the outer rim and to secure an outer bead of the outer tire;
a channel extending continuously around a circumference of the outer rim and radially into an outer rim projection of the outer rim, wherein the outer rim projection extends radially outwardly relative to the outer portion;
an inner enhanced portion on an outer surface of the inner portion and proximate to the inner rim, wherein the inner enhanced portion is configured to engage an inner bead of an inner tire; and
an outer enhanced portion on an outer surface of the outer portion and proximate to the outer rim, wherein the outer enhanced portion is configured to engage an outer bead of the inner tire.

9. The wheel of claim 8, wherein the inner enhanced portion is a knurl, and the outer enhanced portion is a knurl.

10. The wheel of claim 8, further comprising:
an inner rim projection of the inner rim, wherein the inner rim projection extends radially outwardly relative to the inner portion, and the inner rim projection has a width in an axial direction and is configured to separate the outer tire and the inner tire,
wherein the outer rim projection has a width in an axial direction, wherein the width of the outer rim projection is larger than the width of the inner rim projection, and wherein the outer rim projection is configured to separate the outer tire and the inner tire, and
wherein the channel is configured to receive a valve stem.

11. The wheel of claim 10, wherein the outer beadlock ring has an outer beadlock projection with a width in an axial direction, wherein the width of the outer rim projection is larger than the width of the outer beadlock projection.

12. The wheel of claim 8, wherein the inner enhanced portion extends around a circumference of the inner portion, and the outer enhanced portion extends around a circumference of the outer portion.

13. The wheel of claim 8, further comprising:
an inner beadlock knurl on the inner beadlock ring; and
an inner rim knurl on the inner rim, wherein the inner beadlock knurl and the inner rim knurl are configured to contact and secure the inner bead of the outer tire.

14. The wheel of claim 8, further comprising:
an outer beadlock knurl on the outer beadlock ring; and
an outer rim knurl on the outer rim, wherein the outer beadlock knurl and the outer rim knurl are configured to contact and secure the outer bead of the outer tire.

15. A racing wheel, comprising:
an inner portion, a middle portion, and an outer portion, wherein the middle portion joins the inner and outer portions, a valve stem disposed on at least one of said portions, and a hub extends from the middle portion and is configured to engage a wheel hub assembly of a vehicle;
an inner rim positioned at a distal end of the inner portion;
an outer rim positioned at a distal end of the outer portion, wherein the outer rim has an outer rim projection that extends radially outwardly relative to the outer portion, and the outer rim projection has a width and an inner enhanced portion that is configured to engage at least a portion of an inner tire;
a channel extending continuously around a circumference of the outer rim and radially into the outer rim projection;
an inner beadlock ring configured to engage the inner rim and to secure an inner bead of an outer tire; and
an outer beadlock ring configured to engage the outer rim and to secure an outer bead of the outer tire, wherein the outer beadlock ring has an outer beadlock projection with a width, and wherein the width of the outer rim projection is larger than the width of the outer beadlock projection.

16. The wheel of claim 15, further comprising:
an inner portion knurl on an outer surface of the inner portion and proximate to the inner rim, wherein the inner portion knurl is configured to engage an inner bead of the inner tire; and
an outer portion knurl on an outer surface of the outer portion and proximate to the outer rim, wherein the outer portion knurl is configured to engage an outer bead of the inner tire.

17. The wheel of claim 15, further comprising:
an inner rim projection of the inner rim, wherein the inner rim projection extends radially outwardly relative to the inner portion to support the sealing of the inner tire when secured thereagainst, and the inner rim projection has a width, wherein the width of the outer rim projection is larger than the width of the inner rim projection, and
wherein the channel is configured to receive the valve stem.

18. The wheel of claim 17, wherein the outer portion is configured to receive a second valve stem.

19. The wheel of claim 15, wherein the inner portion, the middle portion, the outer portion, and the hub are a continuous structure.

20. The wheel of claim 19, wherein the continuous structure is made of one of an aluminum alloy, a steel alloy, a magnesium alloy, a titanium alloy, or a carbon fiber material.

* * * * *